March 7, 1967 L. F. BEAN 3,308,234

FACSIMILE RECORDER USING THERMOPLASTIC RECORD WITH PHOTOCONDUCTIVE LAYER

Filed Dec. 30, 1963 2 Sheets-Sheet 1

INVENTOR.
LLOYD F. BEAN

BY Stanley Z. Cole
James J. Ralabate
ATTORNEY

March 7, 1967 L. F. BEAN 3,308,234

FACSIMILE RECORDER USING THERMOPLASTIC RECORD WITH PHOTOCONDUCTIVE LAYER

Filed Dec. 30, 1963 2 Sheets-Sheet 2

INVENTOR.
LLOYD F. BEAN
BY Stanley Z. Cole
James J. Ralabate
ATTORNEY

3,308,234
FACSIMILE RECORDER USING THERMOPLASTIC RECORD WITH PHOTOCONDUCTIVE LAYER

Lloyd F. Bean, Rochester, N.Y., assignor to Xerox Corporation, Rochester, N.Y., a corporation of New York Filed Dec. 30, 1963, Ser. No. 334,250
10 Claims. (Cl. 178—6.6)

This application is a continuation-in-part of copending application S.N. 281,233, filed May 17, 1963.

The present invention relates to the art of recording intelligence and more particularly to the art of transducing electrical signals representative of information into visible images.

In most systems where large amounts of information are transmitted over relatively long distances, this information is generally converted to digital or analog electrical signals representative of the information and then sent either by radio propagation or over transmission lines to a remote receiving station. This receiving station generally includes some type of transducing means to convert the electrical signal received into a record, either visible or invisible; permanent or transitory as required. Thus, for example, when large quantities of data as from a computer output, a video signal, or other signals containing large amounts of information are transmitted, they are frequently converted to a permanent but invisible record on magnetic recording tape. In other instances the signal may be used to generate a transitory image on the face of a cathode ray tube or it may be fed to a facsimile recorder where it is converted to a relatively permanent graphic image. Although the art of erasable recording of images on magnetic tape in an invisible form has reached a very sophisticated state, the art of high speed recordings of directly visible images is still in its infancy in many respects. For example, directly visible image recording is now generally accomplished by one of the direct recording techniques now commonly employed in facsimile recording or by a photo-recorder of the type which presently finds its greatest use in news photo facsimile systems. The direct recording systems for the most part employ either an electrolytic or an electrosensitive recording paper. An image is formed on these specially fabricated recording papers by causing electrical discharges through very small surface areas of the recording paper which consequently discolor the papers according to the magnitude of the applied potential. Since these specially treated recording papers may not generally be used to form a second image, the cost of materials with this type of recording system is relatively high, and in addition, the discrete and rather uncontrollable nature of the electrical discharges leads to the formation of rather crude images. Even when poor quality may be tolerated in the final image, these systems frequently may not be employed because of their extremely slow recording speeds. Where higher quality or faster recording is required, silver halide recording materials are generally utilized. Instead of using the input signal to cause an electrical discharge on the recording paper as in the direct recorders described above, these photo facsimile systems employ glow lamp recording or a flying spot scan from a cathode ray tube as an output light source which is focused on a spot of the recording medium and caused to scan across the recording medium while the light intensity is varied according to the amplitude of the signal input. It is to be noted, however, that there are certain disadvantages to the silver halide photo facsimile recorders which offset their advantages to a large extent. These include the high cost of the silver halide recording mediums and the fact that they may not be reused so as to amortize their relatively high cost over a large number of copies, the fact that they must be developed with messy liquid developers under controlled conditions and the fact that image access time is relatively high because the images formed are not visible until after development.

A new technique for the formation of visible images known as "frost imaging" has recently been devised and is more fully described in an article entitled "A Cyclic Xerographic Method Based On Frost Deformation" by R. W. Gundlach and C. J. Claus, appearing in the January-February 1963 issue of the Journal of Photographic Science and Engineering. Basically, this new technique involves applying a latent electrostatic image or charge pattern to an insulating film which is softenable as by the application of heat or a solvent vapor and softening the film until the electrostatic repulsion forces of the charge pattern exceed the surface tension forces of the film. When this critical, or threshold condition is met, a series of very small folds or wrinkles are formed on the surface of the film with the depth of these folds in any particular surface area of the film being dependent upon the amount of charge in that area, thus giving the image a frosted appearance. Actually, the film may be softened prior to the application of the charge pattern, so long as it is sufficiently insulated to hold the charge, the basic requirement being that the charge pattern be on the film while it is in its softened condition. This generally requires highly insulating film; however, in cases where charging may be continued during softening, films with relatively low resistivities on the order of about $10^{10}$ ohm-centimeters may be employed. These lower resistivity films are also referred to as insulating for purposes of this description. This "frost" image is then frozen by allowing or causing the film to reharden as by removing the heat or solvent vapors or in the case of a material which at room temperature is sufficiently soft to frost under the influence of a deposited charge pattern by cooling the material. It has also been found possible to erase such images after use by simply resoftening the film and maintaining a low viscosity for a sufficient period of time. Discharge is believed to occur during this resoftening by fluid migration of the ions making up the charge pattern on the top surface of the frosted film, whereupon surface tension forces restore a smooth surface to the film. More recently, an improved frost process has been devised in which the wrinkles or folds making up the frost image are formed at an interface within a composite or laminated film. Reference is made to a copending application, Serial No. 281,233, filed May 17, 1963 entitled, Internal Frost Recording, in the names of Lloyd F. Bean and Robert W. Gundlach for a more complete and detailed disclosure of this improved process. Not only are all of the advantages of the ordinary frost process, such as reusability of the recording film, lack of requirement for consumable supplies and fast access time to formed images inherent in this improved frost process, but it also has a number of additional advantages including significantly higher resolution capabilities and freedom from dust, lint, and other foreign matter which is apt to be picked up from the atmosphere upon softening of the frostable film when the film is not protected or separated from the atmosphere during the period in which it is in its softened condition. Not only may the film in this improved process be softened during image formation and/or erasure without fear of harm to the film, but in addition, a continuous web of the film may be wound on a reel without adjacent coils of the film sticking to each other because of their tacky nature when in their relatively softened condition.

Now in accordance with the present invention, it has been found that the internal frost imaging technique may be employed in a novel recording system. Although a somewhat analogous technique has been developed for electron beam recording on thermoplastics under vacuum conditions, the technique of the instant invention is operable under atmospheric conditions and is capable of producing extremely high quality images. Basically, the technique of this invention employs a scanning spot of light which acts, in effect, as a switch to make very small successive spots of the recording layer to which it is applied susceptible to the formation of a frost image by a video signal which is simultaneously applied uniformly across the whole recording film.

Accordingly, it is one of the principal objects of this invention to define a novel method of graphically recording varying electrical signals.

It is a further object of this invention to define an apparatus for the graphic recording of varying electrical signals on an internally frostable recording medium.

It is yet another object of this invention to define novel methods and apparatus for transducing varying electrical signals into graphic records with electro-optical mixing techniques.

The above and still further objects, features, and advantages of the present invention will become apparent upon consideration of the following detailed disclosure of specific embodiments of the invention, especially when taken in conjunction with the accompanying drawings wherein like numerals are used to refer to like elements throughout.

Figure 1:
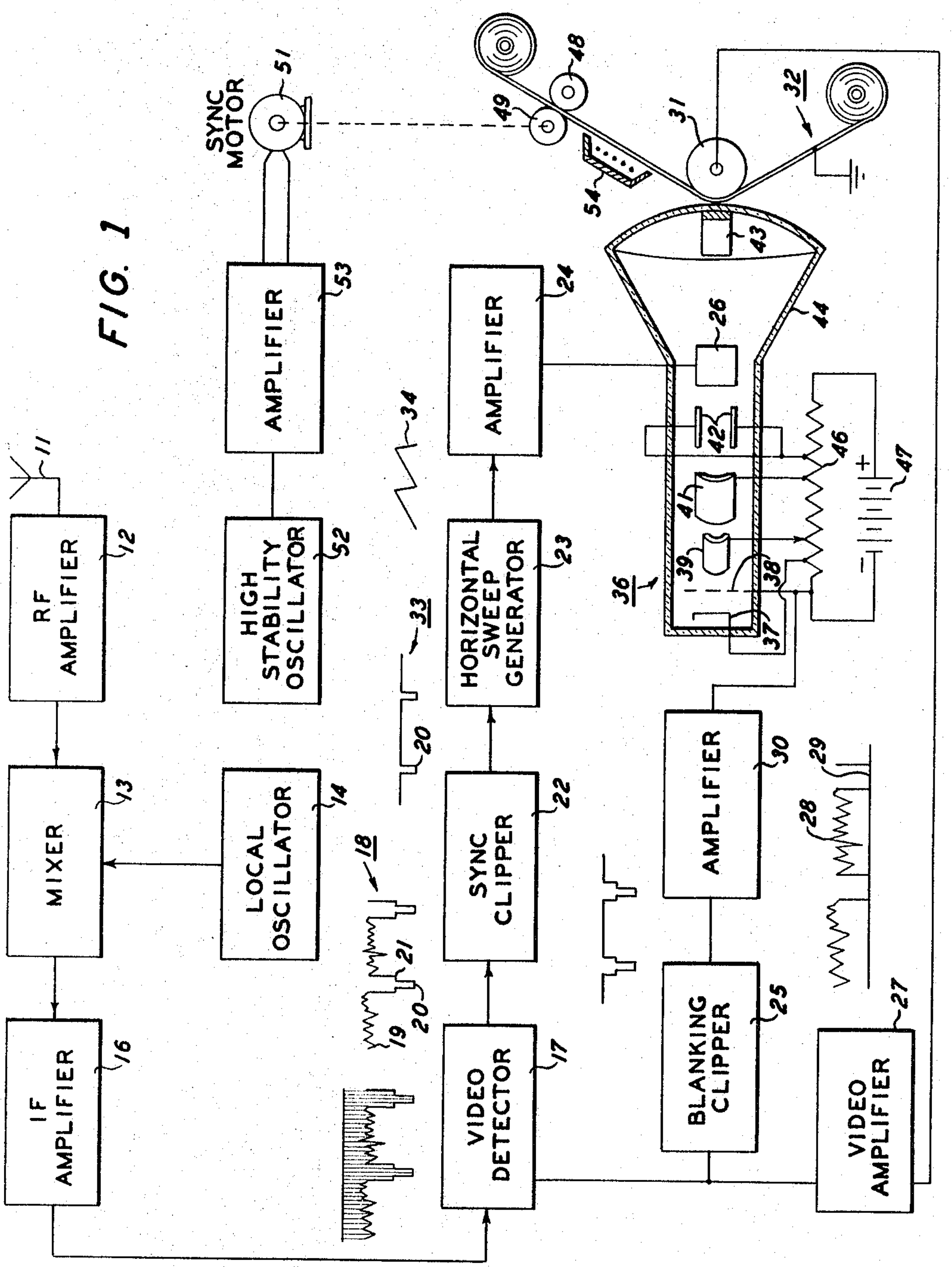
FIG. 1 is a partially diagrammatic side sectional view of an embodiment of a complete recording apparatus according to this invention.

Referring now to the exemplary embodiment of this invention illustrated in FIG. 1, it is seen that an input signal on an R.F. carrier is received on antenna 11 and fed into a tuned R.F. amplifier 12 which increases the signal level and feeds the signal on to mixer 13 where it is beat with a signal from local oscillator 14. The intermediate frequency output of mixer 13 is connected to an IF amplifier 16 which amplifies the signal and feeds it onto video detector 17. The IF waveform is shown between the IF amplifier 16 and video detector 17 slightly above the detector block.

The video detector 17 demoulates or separates the signal generally designated 18 from its I.F. carrier and transmits it simultaneously to both the sync clipper 22 and the video amplifier 27. The waveform 18 is a standard, negative polarity, composite video signal including a video portion 19, a synchronizing pulse portion 20, and a blanking pulse portion 21. Video amplifier 27 is selected so that it is driven to cut off at a point near the lowest part of the video portion 19 of the composite signal 18. Consequently, video amplifier 27 is driven even further beyond cut-off during the synchronizing and blanking pulse portions 20 and 21 of the composite video signal 18. Thus, it is seen that the video amplifier produces an output waveform composed of an amplified portion 28, corresponding to the original video portion 19 of the composite waveform 18 and a blank or zero output portion 29 corresponding to the synchronizing and blanking pulse portions 20 and 21 respectively of the original composite video waveform 18. The output waveform from video amplifier 27 is then applied to a conductive idler roller 31 for application across a recording web 32. As will be more fully explained hereinafter in connection with FIG. 2, this causes the output waveform of video amplifier 27 to be applied across the recording web 32 since a portion of the recording web which is electrically separated from idle roller 31 is connected to ground. As stated above, video detector 17, in addition to feeding its output to video amplifier 27, also has its output connected to sync clipper 22 which is designated to take off the sync pulse portions

20 of the composite video waveform 18 resulting in an output wavefrom as shown at 33. This sync pulse output waveform is then fed on to a horizontal sweep generator 23 which produces a conventional saw-tooth wave 34 of the type commonly utilized in cathode ray tube horizontal deflection circuits. This waveform is amplified by amplifier 24 and then applied across horizontal electrostatic deflection plates 26 (one of which is not seen in FIG. 1) within a cathode ray tube generally designated 36. This cathode ray tube contains a cathode 37, a grid 38, first and second anodes 39 and 41 and a set of vertical electrostatic deflection plates 42. A high voltage potential source 47 is applied across a resistor 46 with the polarities indicated in the drawing and the various cathode ray tube elements are connected or tapped in along this resistor as shown to provide the voltages required for the electron gun. No varying electrical video signal is applied to the grid of the electron gun and the electron gun components are connected in the circuit so as to provide an electron beam of constant magnitude and of the highest allowable intensity for the cathode ray tube. It is to be noted, however, that a blanking clipper 25 is also connected to the output of the video detector and is set so that it clips off only the blanking and sync pulse portions of the video waveform 18 feeding these on to an amplifier 30, the output of which, is in turn connected to the grid 38 of the cathode ray tube. The application of these pulses through amplifier 30 serves to cut off the electron beam so that there is no light output from it during retrace. Vertical deflection plates 42 are electrically connected together and no varying signal is applied to them so that they produce no vertical deflection of the electron beam. In addition, they are tapped into the variable resistor 46 at a point closely adjacent to the tap-in point of the second anode 41 so that they are at approximately the same potential as that anode and thus they do not interfere with focusing or acceleration of the electron beam. Since no potential difference is applied across the vertical deflection plates 42, the electron beam deflection is limited to a horizontal strip of phosphor 43 across the end face of the tube envelope 44. Although an ordinary cathode ray tube with its complete end face coated with a phosphor may be employed, the strip coating of phosphor 43 on the end face of the tube has been employed herein so as to more graphically illustrate the scanning path of the electron beam.

The effect of the system components described thus far then, is to cause a high intensity spot of light to scan horizontally across the face of the cathode ray tube 36 while the amplified video signal is applied across the recording web 32. This recording web is advanced by the rotation of an idle roller 48 and a second roller 49 driven by synchronous motor 51 which is powered by the output of high stability oscillator 52 amplified in an amplifier 53. This oscillator may conveniently be turned on and off by connecting the output of video detector 17 to a switching circuit which controls the oscillator. By employing an oscillator 52 which is carefully preset to have an output frequency with the desired relationship to the vertical scanning of the camera portion of the signal transmitter vertical scanning of the recording 32 may be synchronized with the vertical scan of the camera and transmitter.

A resistance heating unit 54 is also provided to heat the recording film after simultaneous scanning and video signal application to it. This causes the frosted image to appear on the recording film as will be more fully described hereinafter.

Figures 2, 3:
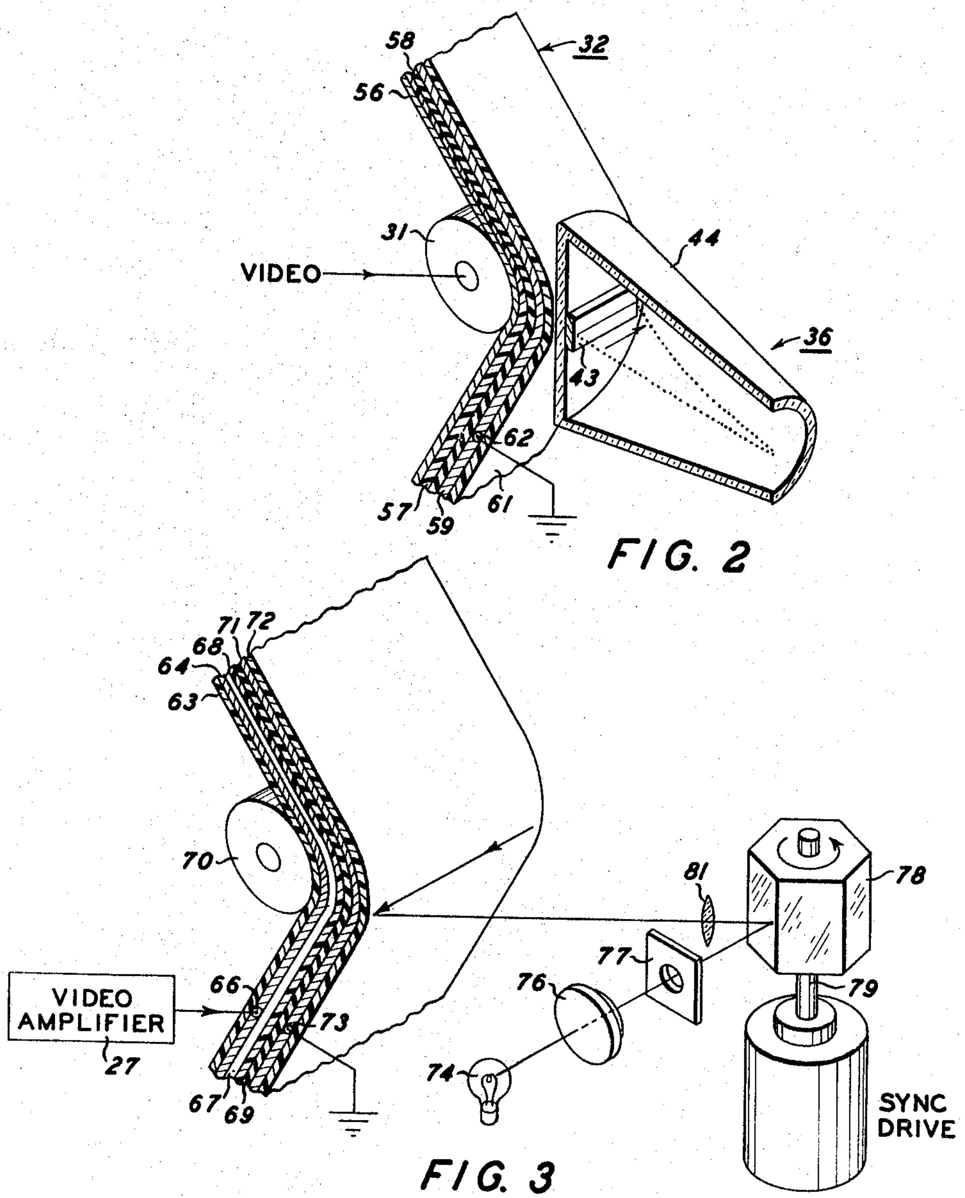
FIG. 2 is a partially sectioned isometric view of a portion of the FIG. 1 apparatus.
FIG. 3 is a side sectional view of a modified recording head and recording medium according to this invention.

In FIG. 2 there is shown an exploded partial view of the recording head of FIG. 1 showing the recording web enlarged out of proportion for purposes of description and illustration of the process. This application is a continuation-in-part of copending application, S.N. 281,233 filed May 17, 1963 and may employ the recording webs described in that application. The recording web illustrated in FIG. 2 herein consists of a conductive layer 56 overcoated with a deformable photoconductive layer 57, a frostable thermoplastic layer 58, a transparent conductive layer 59 and a transparent substrate 61. Since an important use of the image formed on the recording web according to this invention is as a transparency for projection, it is generally but not always required that all layers in the web be transparent. Layer 61 may, for example, consist of a Mylar film (a trademark of E. I. du Pont and Co. for polyethylene terephthalate) overcoated with a very thin transparent conductive layer 59 which may, for example, consist of a very thin evaporated layer of aluminum or gold or very thin layers of copper iodide, tin oxide, or other thin transparent conductive layers known in the art. Layer 58 may consist of any transparent insulating layer capable of forming an image by frost deformation. The process of frost deformation imaging is generally described above and in patent application Serial No. 193,277, filed May 8, 1962, and frost deformation at an interface within a recording web is more fully described in the above referenced copending application, Serial No. 281,233, filed May 17, 1963, now U.S. Patent No. 3,196,011. One of the more desirable materials for the formation of such frost images and one which may be employed as layer 58 in the recording film of this invention is Staybelite Ester 10, a product of the Hercules Powder Company of Wilmington, Delaware, which consists of the glycerol esters of a partially hydrogenated rosin. Other insulating frostable materials which may be employed are described in the referenced copending applications, and many other materials on which frost images cannot be formed will serve to form another type of deformation image known as a "relief" image as described in U.S. patent application, Serial No. 193,276, filed May 8, 1962. This type of deformation is similar to frost in that it is made by deforming a softened charged layer but differs in that deformation only takes place at places of high potential gradient on the charge bearing surface.

Regardless of whether the images formed in recording layer 32 are utilized as projection transparencies or not, layers 58, 59 and 61 must always be transparent to a certain extent so that the light output from the face of the cathode ray tube 36 may penetrate through these layers to activate layer 57 which is a deformable photoconductive insulating layer and may consist of a mixture of certain organic photoconductors and other resins as described at length in the above referenced application, Serial No. 281,233, filed May 17, 1963. It is essential in this embodiment of the invention that the photoconductive film 57 be a good insulator and be capable of deforming at the temperature at which the frost image is formed on the thermoplastic layer 58, since this image is formed at the interface of layers 57 and 58 and if either of these layers were not deformable the image could not form. In the event that the recording film 32 is employed as a transparency for projection requiring that conductive layer 56 be transparent, the recording film may also include a Mylar supporting substrate layer on the outer or free surface of the conducting layer so this layer may be evaporated onto the Mylar for easy fabrication of the recording film. Thus, layer 56 and its supporting Mylar substrate may correspond to layer 59 and its supporting Mylar substrate 61. Another requirement of the recording film 32 is that the two layers which form the interface at which the deformation or frost image is formed, have significantly different refractive indices so that the deformation image will be visible upon projection of the image. Obviously, if this condition were not met, the deformation image formed at the interface would be invisible because light would pass through it without diffusion in areas of deformation. This requirement is more fully explained in the above referenced copending application.

In operation, the video output signal is applied to conductive roller 31 which extends across the width of the back of the conductive web layer 56. Conductive layer 59 makes sliding contact with a brush 62 which is connected to ground so that the video output signal is applied across the photoconductive and thermoplastic layers 58. In the event that a supporting substrate of Mylar or the like is applied behind conductive layer 56, a video signal may be applied to this layer through a brush similar to brush 62 which is employed to connect a conductive layer 59 to ground. Simultaneously, with the application of the video signal across the recording web 32, the web is being horizontally scanned with a very small spot of light which is produced in the cathode ray tube 36 that is produced therein by the scanning of the electron beam across the horizontal phosphor 43 in the face of the cathode ray tube. Because of the very low bias voltage on the grid 38 of the cathode ray tube, the spot of light produced in this scan is very intense. This scanning light penetrates through the recording film to the photoconductive insulating layer 57 and serves to render small successive spots along the line of the scan relatively more conductive when the light impinges upon them. Anytime that light strikes a portion of the photoconductive layer while a potential is being applied across the recording web, charge is allowed to move through this relatively more conductive portion of the photoconductive insulating layer to the interface between the photoconductive insulating layer and the insulating thermoplastic layer 58. Since light has no effect upon the conductivity of the insulating thermoplastic layer the charge is stopped at this interface and when the light moves on to another portion of the photoconductive insulating layer, this layer reverts to its insulating condition trapping the charge at the interface between the two layers. It is thus seen that the light acts as a scanning switch to "turn on and off" various portions of the recording web 32 making them susceptible to the application of the video signal. Putting it in another way, the scanning light serves to apply the instantaneous value of the video signal to the desired portion of the recording web 32. Consequently, the charge stored at any particular spot on the interface between the photoconductive and thermoplastic layers is dependent upon the magnitude of the video signal at the particular time when the spot of light from the cathode ray tube impinges upon it. Since the speed of the web is synchronized with the vertical scan of the transmitter pickup and the horizontal scan of the cathode ray tube 36 is synchronized with the horizontal scan of the transmitter pickup, the charge pattern formed and trapped at the interface on the recording web exactly corresponds with the original of the image transmitted. After this charge pattern is formed at the interface of the photoconductive and thermoplastic layers in the recording web 32 the web is passed under a heater which softens these layers. Preferably, any other layers in the recording web, such as the Mylar layer 61 are selected to be sufficiently heat resistant so that they are not softened and consequently provide good mechanical support for the web at this increased temperature. This softening of layers 57 and 58 in the web is sufficient to bring the viscosity of the thermoplastic layer down to a point referred to as the frost threshold point, that is to say, sufficiently low so that the force of the charge bound at the interface of the photoconductor and thermoplastic layers is sufficient to overcome the surface tension forces of the softened thermoplastic film causing it to form wrinkles, making up the desired image. At the same time, the photoconductive film 57 must be sufficiently soft at this raised temperature so that it will give or conform to the wrinkles formed when the frosted image is made. The film may then be cooled or allowed to cool thereby hardening or freezing the frost image which may then be utilized as a transparency. For example, after use, the film may be resoftened so as to erase the image and may be recycled through the whole process.

In FIG. 3 there is illustrated another embodiment of the invention in which the recording film 32 is made up of a supporting substrate layer 63 carrying a thin conductive layer 64 which is in this instance transparent so as to render the whole of the film suitable for use as a transparency in an image projection system. This conductive layer is connected to the output of video amplifier 27 through a brush 66 and the layer is overcoated with a film of a viscous conductor 67. This layer is of a material that is relatively electrically conductive as compared to the material of thermoplastic layer 68. Layer 67 should be of a low viscosity or at least softenable by the temperature required to reduce the viscosity of the frostable layer 68 to the frost threshold, to a viscosity preferably of the same order or of a lower order of magnitude than that of layer 68. Suitable materials are described in the above referenced copending application and include fluids such as water, alcohol, glycerine, sucrose, acetate, isobutyrate and materials which are solid at room temperature such as certain solid polyethylene glycols available under the trade name "Carbowax." Since frost imaging takes place at the interface of layers 67 and 68 these layers should have different indices of refraction so the images formed will be visible. Under the deformable thermoplastic layer 68, which is on layer 67 is a photoconductive insulating layer 69. Because the photoconductive insulator need not be deformable in this embodiment, many sensitive nondeformable photoconductors such as cadmium sulfide and amorphous selenium may be used. Adjacent photoconductive insulating layer 69 there is a transparent conductive layer 71, and a transparent supporting substrate layer 72. This layer 72 along with layer 63 may be of Mylar where flexibility is required or of glass or other transparent dimensionally stable materials which may be available. Since conductive layer 71 is connected to ground through a brush 73, the video signal is applied across layers 67, 68 and 69 while a light beam is scanning across the recording web 32 to activate successive small spots of the photoconductive insulating layer rendering them relatively more conductive during the period which they are being scanned. Charge from the video signal can move through viscous conductive layer 67 to its interface with thermoplastic layer 68 acting to charge the effective capacitor created by the two dielectric layers 68 and 69. This, of course, will induce charge up from the grounded conductive backing layer 71 of this "capacitor." However, where the light strikes the photoconductor it renders it more conductive effectively eliminating its electrical thickness from the total dielectric thickness within the capacitor. Since this decrease in the thickness of the dielectric layer within the capacitor increases its capacitance, more charge can be deposited upon those surface layers of the thermoplastic layer 68 overlying portions of the photoconductive insulating layer which are being exposed to light at that particular time. By making the photoconductive insulating layer significantly thicker than the thermoplastic layer, light exposure can have a gross effect upon the amount of charge which will be accepted in exposed areas as opposed to the amount which will be accepted in unexposed areas, thus again, causing the scanning light to act as a switch which determines what particular section of the recording web will be effectively exposed to the video signal. By selecting the recording film parameters so that the amount of charge accepted by the "capacitor" in unexposed areas is below that required to cause frost deformation, the desired effect is achieved as stated above. In this embodiment the photoconductive insulating layer need not be deformable because deformation takes place at the interface between the thermoplastic layer 68 and the viscous conductive layer 67. Even after the video signal is shut off, charge of the desired magnitude is bound at the interface of the conductive layer 67 and the thermoplastic frostable layer 68 due to the fact that charge of opposite polarity is trapped at the interface between the photoconductive insulating layer 69 and the thermoplastic frostable layer 68. Once charge is bound at the deformable interface, the frost image is developed by merely softening the thermoplastic as by the application of heat in a manner similar to that described in connection with the FIG. 2 embodiment of this invention. In this instance a heated roller 70 is employed for this purpose.

Although the FIG. 1 embodiment of this invention makes use of a cathode ray tube as its flying spot light scanning source this type of light source is generally only suitable for relatively low speed scanning because even the maximum light output available from such cathode ray tubes is generally inadequate for very high speed scanning with hte photoconductors which are generally employed in the internal frost recording webs of this invention. The cathode ray tube system is, however, desirable in low speed systems because it provides a convenient, easily synchronized and generally predesigned light scanning system. Control and adjustment of the light scan is easily accomplished, there are no precise mechanical adjustments to be made and no moving parts to wear out. In other higher speed systems, however, it is virtually mandatory that the conveniences of the cathode ray flying spot scan system be abandoned in favor of other scanning techniques which are capable of producing much higher light intensities so as to compensate for the relatively low photographic speeds of the photoconductors employed in the recording web of the invention. Such a scanning system is illustrated in FIG. 3 where a high intensity light source 74 such as a concentrated mercury arc light has its output focused by a lens 76 through an aperture 77 onto one face of a hexagonal mirror 78 mounted for rotation on a driven shaft 79. Many different polygonal shapes may be employed in place of the hexagonal mirror 78. As this mirror rotates on its shaft 79, the light from light source 74 is reflected off one face of the mirror after another and while the light is imaged on one face of the mirror, the mirror is continually moving so that the angle of incidence made by the light beam with the plane of the mirror face is constantly changing. The result is that the light is reflected off the mirror through a lens 81 and caused to scan horizontally across the face of the recording web 32, as pointed out above. This allows for a flying spot of light of extremely high intensity thereby allowing for great increases in the effective speed of the over-all system and compensating greatly for the low photographic speed of the photoconductors employed in the recording web. With this type of scanning, synchronization may be accomplished by a number of known techniques such as using the sync portion of the composite video signal to drive a sinusoidal wave generator whose output is employed to operate the synchronous motor drive of the mirror. Alternatively, a selsyn generator motor set may be connected to the scanning head shafts of the video source and recorder (79) respectively, to achieve synchronization.

What is claimed is:

1. A recorder for the conversion of electrical signals to visible images comprising a recording web made up of a pair of conductive layers separated by as least a layer of a photoconductive insulating material and a layer of an insulating thermoplastic material capable of forming a deformation image and in which at least all of the layers on one side of said photoconductive insulating layer transmit electromagnetic radiation to which said photoconductive insulating material in sensitive, the image forming side of said insulating thermoplastic material being in contact with a layer of material having a different refractive index and capable of conforming with surface deformations of said insulating thermoplastic material, means to apply a varying electrical signal across said conductive layers, means to scan said photoconductive insulating layer with a constant high intensity source of electromagnetic radiation to which said photoconductive insulating layer is sensitive as said electrical signal is applied so as to form a bound charge pattern on the surface of said insulating thermoplastic layer, said charge pattern having an intensity in any one area proportional to the instantaneous magnitude of the electrical signal applied across said conductive layers at the time said area is scanned with said electromagnetic radiation source and means to heat at least the insulating thermoplastic layer of said recording web until its viscosity is reduced to a point where a plastic deformation image is formed on the surface of said insulating thermoplastic layer in response to the charge pattern thereon.

2. A recorder according to claim 1 in which the surface upon which said plastic deformation image is formed is in contact with a layer which is deformable at the temperature at which the plastic deformation image is formed on said insulating thermoplastic layer and which has a refractive index which differs from the refractive index of said insulating thermoplastic layer.

3. A recorder for the conversion of electrical signals to visible images comprising a recording web made up of a pair of conductive layers separated by a layer of an insulating thermoplastic material capable of forming a deformation image and a photoconductive insulating material capable of deforming to conform with a deformation image on said insulating thermoplastic material at the temperature at which said deformation image is formed, said photoconductive insulating material and insulating thermoplastic material having different indices of refraction and in which at least all of the layers on one side of said photoconductive insulating layer are light transmitting, means to apply said electrical signals across said conductive layers, means to scan said photoconductive insulating layer with a constant, high intensity source of electromagnetic radiation to which said photoconductive insulating layer is sensitive as said electrical signals are applied across said conductive layers so as to form a bound charge pattern on the surface of said insulating thermoplastic layer adjacent its interface with said photoconductive insulating layer, said charge pattern having an intensity in any one area proportional to the instantaneous magnitude of the electrical signal applied across said conductive layers at the time said area is scanned with said electromagnetic radiation source and means to heat said recording web until the viscosity of said insulating thermoplastic layer is reduced to a point where a plastic deformation image is formed on the surface of said insulating thermoplastic layer adjacent said photoconductive insulating layer in response to the charge pattern deposited thereon.

4. A recorder for the conversion of electrical signals to visible images comprising an integral recording web made up of a pair of conductive layers separated by a layer of a photoconductive insulating material, a layer of an insulating thermoplastic material capable of forming a deformation image and a deformable conductive layer in the order recited with said insulating thermoplastic and said deformable conductive layers having different indices of refraction, and in which at least all of the layers on one side of said photoconductive insulating layer transmit electromagnetic radiation to which said photoconductive insulating material is sensitive, means to apply a varying electrical signal across said conductive layers, means to scan said photoconductive insulating layer with a constant high intensity source of electromagnetic radiation to which said photoconductive insulating layer is sensitive as said signal is applied so as to form a bound charge pattern on the surface of said insulating thermoplastic layer, said charge pattern having an intensity in any one area proportional to the instantaneous magnitude of the electrical signal applied across said conductive layers at the time said area is scanned with said electromagnetic radiation source and means to heat at least the insulating thermoplastic layer of said recording web until its viscosity is reduced to a point where a plastic deformation image is formed on its surface in response to the charge pattern thereon.

5. A recorder for the conversion of electrical signals to visible images comprising a recording web made up of a pair of conductive layers separated by at least a layer of a photoconductive insulating material and a layer of an insulating thermoplastic material capable of forming a deformation image and in which at least all of the layers on one side of said photoconductive insulating layer transmit electromagnetic radiation to which said photoconductive insulating material is sensitive, the image forming side of said insulating thermoplastic material being in contact with a layer of material having a different refractive index and capable of conforming with surface deformations of said insulating thermoplastic material, means to apply a varying electrical signal across said conductive layers, means to sequentially scan small areas of said photoconductive insulating layer with a constant high intensity, source of electromagnetic radiation to which said photoconductive insulating layer is sensitive as said signal is applied so as to form a bound charge pattern on the surface of said insulating thermoplastic layer, said charge pattern having an intensity in any one area proportional to the instantaneous magnitude of the electrical signal applied across said conductive layers at the time said area is scanned with said electromagnetic radiation source, means to control the speed and direction of the scan of said electromagnetic radiation source and means to heat at least the insulating thermoplastic layer of said recording web until its viscosity is reduced to a point where a plastic deformation image is formed on the surface of said insulating thermoplastic layer in response to the charge pattern formed thereon.

6. A recorder according to claim 5 in which said means to control the speed and direction of the electromagnetic radiation source includes means to synchronize said speed and direction with the speed and direction of a scanning system in a transmitter which is the source of said varying electrical signal to be recorded.

7. The method of converting a varying electrical signal to a visible image on a recording web of the type comprising a pair of conductive layers separated by at least a layer of a photoconductive insulating material and a layer of an insulating thermoplastic material capable of forming a plastic deformation image and in which at least all of the layers on one side of said photoconductive insulating layer transmit electromagnetic radiation to which said photoconductive insulating material is sensitive, the image forming side of said insulating thermoplastic material being in contact with a layer of material having a different refractive index and capable of conforming with surface deformations of said insulating thermoplastic material by applying said varying electrical signal across said conductive layers while simultaneously scanning said photoconductive insulating layer with a constant high intensity source of electromagnetic radiation to which said photoconductive insulating layer is sensitive so as to form a bound charge pattern on the surface of said insulating thermoplastic layer, which charge pattern has an intensity in any one area proportional to the instantaneous magnitude of the electrical signal applied across said conductive layers at the time said area is scanned with said electromagnetic radiation source and then heating at least the insulating thermoplastic layer of said recording web until its viscosity is reduced to a point where a plastic deformation image is formed on the surface of said insulating thermoplastic layer in response to the charge pattern thereon.

8. The method of converting a time varying electrical signal to a visible image on a recording web of the type comprising a pair of conductive layers separated by at least a layer of a photoconductive insulating material and an insulating thermoplastic layer capable of forming a plastic deformation image, the image forming side of said insulating thermoplastic material being in contact with a layer of material having a different refractive index and capable of conforming with surface deformations of said insulating thermoplastic material and in which at least all of the layers on one side of said photoconductive insulating layer transmit electromagnetic radiation to which said photoconductive insulating material is sensitive comprising applying said time varying electrical signal across said conductive layers while sequentially scanning small portions of said photoconductive insulating layer with a constant, high intensity source of electromagnetic radiation to which said photoconductive insulating layer is sensitive so as to form a bound charge pattern on the surface of said insulating thermoplastic, said charge pattern having an intensity in any one area proportional to the instantaneous magnitude of the electrical signal applied across said conductive layers at the time said area is scanned with said electromagnetic radiation source and heating at least the insulating thermoplastic layer of said recording web until its viscosity is reduced to a point where a plastic deformation image is formed on the surface of said insulating thermoplastic layer in response to the charge pattern formed thereon.

9. The method according to claim 8 further including synchronizing the speed and direction of scan of said electromagnetic radiation source with the speed and direction of scan of the transmitting source of said varying electrical signal.

10. A method according to claim 9 including synchronizing said scan in response to a signal transmitted from said varying electrical signal source.

References Cited by the Examiner

UNITED STATES PATENTS

| | | | |
|---|---|---|---|
| 3,196,008 | 7/1965 | Mihajlov | 96—1 |
| 3,196,013 | 7/1965 | Walkup | 96—1 |

DAVID G. REDINBAUGH, *Primary Examiner.*

H. W. BRITTON, *Assistant Examiner.*